(12) United States Patent
Horsley et al.

(10) Patent No.: US 10,771,110 B2
(45) Date of Patent: Sep. 8, 2020

(54) METHOD AND APPARATUS FOR OPERATING A DIGITAL SUBSCRIBER LINE ARRANGEMENT

(71) Applicant: British Telecommunications Public Limited Company, London (GB)

(72) Inventors: Ian Horsley, London (GB); Trevor Linney, London (GB); Leslie Humphrey, London (GB); Anas Al Rawi, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/348,043

(22) PCT Filed: Nov. 7, 2017

(86) PCT No.: PCT/EP2017/078509
§ 371 (c)(1),
(2) Date: May 7, 2019

(87) PCT Pub. No.: WO2018/087104
PCT Pub. Date: May 17, 2018

(65) Prior Publication Data
US 2019/0288744 A1    Sep. 19, 2019

(30) Foreign Application Priority Data

Nov. 8, 2016 (GB) .................................... 1618870.8
Nov. 9, 2016 (EP) .................................... 16197854

(51) Int. Cl.
*H04B 3/54*    (2006.01)
*H04B 3/32*    (2006.01)
(Continued)

(52) U.S. Cl.
CPC ............. *H04B 3/542* (2013.01); *H04B 3/32* (2013.01); *H04B 3/548* (2013.01); *H04B 3/56* (2013.01);
(Continued)

(58) Field of Classification Search
CPC .......... H04B 3/32; H04B 3/542; H04B 3/548; H04B 3/56
See application file for complete search history.

(56) References Cited

U.S. PATENT DOCUMENTS

| 5,210,518 A | 5/1993 | Graham et al. |
| 5,889,856 A * | 3/1999 | O'Toole ................. H04L 5/023 370/480 |

(Continued)

FOREIGN PATENT DOCUMENTS

| CN | 1909511 A | 2/2007 |
| CN | 101217590 A | 7/2008 |

(Continued)

OTHER PUBLICATIONS

International Search Report and Written Opinion for corresponding International Application No. PCT/EP2017/078509 dated Feb. 2, 2018; 11 pages.

(Continued)

*Primary Examiner* — Shuwang Liu
*Assistant Examiner* — Gina M McKie
(74) *Attorney, Agent, or Firm* — Patterson Thuente Pedersen, P.A.

(57) ABSTRACT

An aggregation device is arranged to receive a plurality of lines each of which is connected to a user premises and wherein one of the user premises is a multi-terminating-point enabled premises and includes a splitter device connected to the line and at least two distinct terminating points each of which is connected to the splitter device via an (Continued)

in-premises connection and is operable to terminate a two part connection between the respective terminating point and the aggregation device via the splitter device, and the aggregation device includes a transmitter portion, a memory, determination means, and selection means.

15 Claims, 6 Drawing Sheets

(51) Int. Cl.
    *H04B 3/56*           (2006.01)
    *H04M 11/06*         (2006.01)

(52) U.S. Cl.
    CPC ............ *H04M 11/062* (2013.01); *H04B 3/54* (2013.01); *H04B 2203/5425* (2013.01)

(56) References Cited

U.S. PATENT DOCUMENTS

| | | | |
|---|---|---|---|
| 6,028,867 A | 2/2000 | Rawson et al. | |
| 6,061,392 A | 5/2000 | Bremer et al. | |
| 6,208,637 B1 | 3/2001 | Eames | |
| 6,236,664 B1* | 5/2001 | Erreygers | H04L 12/10 370/352 |
| 6,650,697 B1 | 11/2003 | Tate et al. | |
| 6,654,410 B2 | 11/2003 | Tzannes | |
| 7,035,400 B1 | 4/2006 | Gaikwad et al. | |
| 7,061,987 B1 | 6/2006 | Tan et al. | |
| 7,092,364 B1 | 8/2006 | Franklin et al. | |
| 7,266,109 B1 | 9/2007 | Rosenstein et al. | |
| 7,315,571 B1 | 1/2008 | Heidari et al. | |
| 7,796,699 B2 | 9/2010 | Jain et al. | |
| 7,813,434 B2 | 10/2010 | Wu et al. | |
| 8,036,293 B1 | 10/2011 | Kim et al. | |
| 8,144,580 B2 | 3/2012 | Pickering et al. | |
| 8,406,135 B2 | 3/2013 | Pickering et al. | |
| 8,442,149 B2 | 5/2013 | Humphrey et al. | |
| 8,588,285 B2 | 11/2013 | Humphrey et al. | |
| 8,819,221 B2 | 8/2014 | Croot et al. | |
| 9,246,546 B2 | 1/2016 | Croot et al., | |
| 9,584,670 B2 | 2/2017 | Cooper | |
| 9,742,905 B1* | 8/2017 | Schneider | H04L 12/2861 |
| 1,009,102 A1 | 10/2018 | Horsley et al. | |
| 1,019,359 A1 | 1/2019 | Al Rawi et al. | |
| 2001/0012319 A1 | 8/2001 | Foley | |
| 2001/0021185 A1 | 9/2001 | Heusala | |
| 2001/0022836 A1 | 9/2001 | Bremer et al. | |
| 2002/0018521 A1 | 2/2002 | Sherlock | |
| 2002/0054578 A1 | 5/2002 | Zhang et al. | |
| 2002/0136231 A1* | 9/2002 | Leatherbury | H04L 12/2801 370/442 |
| 2003/0051060 A1 | 3/2003 | Vitenberg | |
| 2003/0099286 A1 | 5/2003 | Graziano et al. | |
| 2003/0101243 A1 | 5/2003 | Donahue et al. | |
| 2003/0123560 A1 | 7/2003 | Jacobsen et al. | |
| 2004/0014444 A1 | 1/2004 | Ben et al. | |
| 2004/0186865 A1 | 9/2004 | Schenk | |
| 2004/0240575 A1 | 12/2004 | Rainbolt et al. | |
| 2005/0002441 A1 | 1/2005 | Rovini et al. | |
| 2006/0071776 A1* | 4/2006 | White, II | H02J 13/0086 340/538 |
| 2006/0095581 A1 | 5/2006 | Ali et al. | |
| 2006/0251115 A1 | 11/2006 | Haque et al. | |
| 2007/0109974 A1 | 5/2007 | Cutillo et al. | |
| 2007/0124624 A1 | 5/2007 | Starr | |
| 2007/0133762 A1 | 6/2007 | Berkman | |
| 2007/0263711 A1 | 11/2007 | Theodor et al. | |
| 2007/0274404 A1 | 11/2007 | Papandriopoulos et al. | |
| 2008/0130640 A1 | 6/2008 | Hurwitz et al. | |
| 2008/0159298 A1 | 7/2008 | Peterson et al. | |
| 2008/0170609 A1 | 7/2008 | Heidari et al. | |
| 2008/0212589 A1 | 9/2008 | Yang | |
| 2008/0219290 A1 | 9/2008 | Cioffi et al. | |
| 2008/0292313 A1 | 11/2008 | Mahony et al. | |
| 2009/0028170 A1 | 1/2009 | Jiang et al. | |
| 2009/0270038 A1 | 10/2009 | Clausen et al. | |
| 2009/0296611 A1 | 12/2009 | Monk et al. | |
| 2009/0322556 A1 | 12/2009 | Cook et al. | |
| 2010/0054314 A1 | 3/2010 | Korobkov et al. | |
| 2010/0098188 A1 | 4/2010 | Starr | |
| 2010/0254444 A1 | 10/2010 | Clausen et al. | |
| 2010/0290362 A1 | 11/2010 | Croot et al. | |
| 2011/0019725 A1 | 1/2011 | Keller | |
| 2011/0110359 A1 | 5/2011 | Cooke et al. | |
| 2011/0116621 A1 | 5/2011 | Bukimer | |
| 2011/0142206 A1 | 6/2011 | Jiang et al. | |
| 2011/0150057 A1 | 6/2011 | Anschutz et al. | |
| 2011/0222611 A1 | 9/2011 | Lindqvist et al. | |
| 2011/0274009 A1 | 11/2011 | Cooper et al. | |
| 2012/0020418 A1 | 1/2012 | Sands et al. | |
| 2012/0063531 A1 | 3/2012 | Ginis et al. | |
| 2012/0099424 A1 | 4/2012 | Croot et al. | |
| 2012/0224683 A1 | 9/2012 | Goodson et al. | |
| 2012/0263295 A1 | 10/2012 | Sanchez et al. | |
| 2013/0114625 A1 | 5/2013 | Cunningham | |
| 2013/0229905 A1 | 9/2013 | Schenk et al. | |
| 2013/0236177 A1 | 9/2013 | Fang et al. | |
| 2014/0022926 A1 | 1/2014 | Ling et al. | |
| 2014/0023127 A1 | 1/2014 | Pereira | |
| 2014/0029406 A1 | 1/2014 | Liang et al. | |
| 2014/0098705 A1 | 4/2014 | Chow et al. | |
| 2015/0163350 A1 | 6/2015 | Shi et al. | |
| 2015/0215059 A1 | 7/2015 | Kerpez et al. | |
| 2015/0215194 A1 | 7/2015 | Urban et al. | |
| 2015/0222429 A1* | 8/2015 | Vilella | H04B 10/272 380/256 |
| 2015/0271268 A1* | 9/2015 | Finkelstein | H04L 45/64 370/400 |
| 2015/0318875 A1 | 11/2015 | Kuipers et al. | |
| 2016/0036491 A1 | 2/2016 | Sorbara | |
| 2016/0105215 A1 | 4/2016 | Wang et al. | |
| 2016/0204914 A1 | 7/2016 | Agee et al. | |
| 2017/0026521 A1 | 1/2017 | Horsley et al. | |
| 2017/0085719 A1 | 3/2017 | Linney et al. | |
| 2017/0244446 A1 | 8/2017 | Al et al. | |
| 2017/0279634 A1 | 9/2017 | Horsley et al. | |
| 2018/0083815 A1 | 3/2018 | Humphrey et al. | |
| 2018/0254798 A1 | 9/2018 | Horsley et al. | |
| 2019/0281166 A1* | 9/2019 | Horsley | H04M 11/062 |

FOREIGN PATENT DOCUMENTS

| | | |
|---|---|---|
| CN | 101238645 A | 8/2008 |
| CN | 101926125 A | 12/2010 |
| CN | 102396160 A | 3/2012 |
| EP | 1359696 A2 | 11/2003 |
| EP | 1744514 A1 | 1/2007 |
| EP | 1998524 A1 | 12/2008 |
| EP | 2168307 B1 | 8/2011 |
| EP | 2 645 690 A1 | 10/2013 |
| EP | 2830302 A1 | 1/2015 |
| EP | 2 852 067 A1 | 3/2015 |
| EP | 2852068 A1 | 3/2015 |
| GB | 2542045 A | 3/2017 |
| WO | WO-0035133 A1 | 6/2000 |
| WO | WO-2007049016 A1 | 5/2007 |
| WO | WO-2008005507 A2 | 1/2008 |
| WO | WO-2012015817 A2 | 2/2012 |
| WO | WO-2013026479 A1 | 2/2013 |
| WO | WO-2014039004 A1 | 3/2014 |
| WO | WO-2014122118 A1 | 8/2014 |
| WO | WO-2015055975 A1 | 4/2015 |
| WO | WO-2015150773 A1 | 10/2015 |
| WO | WO-2018087106 A1 | 5/2018 |
| WO | WO-2018166922 | 9/2018 |

OTHER PUBLICATIONS

3GPP, "LTE; Evolved Universal Terrestrial Radio Access (E-UTRA); Physical channels and modulation," ETSI TS 136 211, Version 10.0.0, Release 10, Jan. 2011.

(56) References Cited

OTHER PUBLICATIONS

Annex to the Communication/Summons to Attend Oral Proceedings dated Oct. 5 2010 for Application No. EP06794870.3, filed Oct. 23, 2006, 5 pages.
Application and File History for U.S. Appl. No. 16/348,053, filed May 7, 2019, Inventor Horsley, available at www.uspto.gov.
Application and Filing Receipt for U.S. Appl. No. 15/759,340, filed Mar. 12, 2018, Inventor Horsley, available at www.uspto.gov.
Application and Filing Receipt for U.S. Appl. No. 15/312,264, filed Nov. 18, 2016, inventor Linney, available at www.uspto.gov.
Application and Filing Receipt for U.S. Appl. No. 14/388,909, filed Sep. 29, 2014, Inventor Cooper, available at www.uspto.gov.
Application and Filing Receipt for U.S. Appl. No. 15/515,403, filed Mar. 29, 2017, Inventor Al Rawi, available at www.uspto.gov.
Application and Filing Receipt for U.S. Appl. No. 15/504,795, filed Feb. 17, 2017, Inventor Horsley, available at www.uspto.gov.
Application and Filing Receipt for U.S. Appl. No. 16/494,159, filed Sep. 13, 2019, Inventor Cooper, available at www.uspto.gov.
Cioffi, et al., "Band Preference in Dynamic Spectrum Management," 2004 12th European Signal Processing Conference, Vienna, 2004, pp. 1205-1208.
Combined Search and Examination Report under Sections 17 and 18(3) for Great Britain Application No. 1704069.2, dated Sep. 5, 2017, 5 pages.
Communication about Intention to Grant a European Patent dated Apr. 15, 2011 for Application No. EP06794870.3, filed Oct. 23, 2006, 24 pages.
Communication from the Examining Division/Annex to the Communication dated Mar. 27, 2009 for Application No. EP06794870.3, filed Oct. 23, 2006, 5 pages.
Crabtree B., et al., "Equitable Quality Video Streaming," Apr. 2008, BT Group Chief Technology Office, 6 pages.
ETSI TS 101 270-1 V1.2.1, "Transmission and Multiplexing (TM); Access transmission systems on metallic access cables," Very high speed Digital Subscriber Line (VDSL), Part 1: Functional requirements, Oct. 1999, 60 pages.
European Search Report for Application No. EP05256607.2, dated Mar. 29, 2006, 7 pages.
Extended European Search Report for Application No. 14250078.4, dated Nov. 12, 2014, 6 pages.
Extended European Search Report for Application No. 17160971.2, dated Sep. 20, 2017, 9 pages.
Extended European Search Report for Application No. EP14275196.5, dated Mar. 6, 2015, 6 pages.
First Office action dated Sep. 28, 2017 for Chinese Application No. 201580050864.7 filed Aug. 18, 2015, 11 pages.
Huawei Technologies, "G.fast: Synchronous Time-Division Duplexing Frame Structure," TD2012-05-4A-027, ITU-T Draft, Study Period 2009-2012, International Telecommunication Union, vol. 4a/15, Oct. 12, 2012, 5 pages.
International Preliminary Report on Patentability for Application No. PCT/EP2015/072407, dated Apr. 13, 2017, 7 pages.
International Search Report and Written Opinion for Application No. PCT/EP2017/078512, dated Feb. 26, 2018, 10 pages.
International Preliminary Report on Patentability for Application No. PCT/EP2015/068941, dated Jan. 3, 2017, 12 pages.
International Preliminary Report on Patentability for Application No. PCT/EP2016/072012, dated Mar. 29, 2018, 8 pages.
International Preliminary Report on Patentability for Application No. PCT/EP2017/078509, dated May 23, 2019, 9 pages.
International Preliminary Report on Patentability for Application No. PCT/EP2017/078512, dated May 23, 2019, 8 pages.
International Preliminary Report on Patentability for Application No. PCT/EP2018/055950, dated Sep. 26, 2019, 8 pages.
International Preliminary Report on Patentability for Application No. PCT/GB2015/051257, dated Aug. 5, 2016, 6 pages.
International Preliminary Report on Patentability for Application No. PCT/GB2006/003934, dated Apr. 29, 2008, 6 pages.
International Search Report and Written Opinion for Application No. PCT/EP2015/068941, dated Oct. 27, 2015, 9 pages.
International Search Report and Written Opinion for Application No. PCT/EP2015/072407, dated Dec. 18, 2015, 9 pages.
International Search Report and Written Opinion for Application No. PCT/EP2016/072012, dated Dec. 19, 2016, 9 pages.
International Search Report and Written Opinion for Application No. PCT/EP2018/055950, dated May 16, 2018, 10 pages.
International Search Report and Written Opinion for Application No. PCT/GB2015/051257, dated Jul. 20, 2015, 9 pages.
International Search Report for Application No. PCT/GB2006/003934, dated Jan. 9, 2007, 2 Pages.
International Search Report for Application No. PCT/GB2013/000130, dated Jun. 6, 2013, 3 pages.
International Telecommunication Union, "ITU-T G.992.1, Series G: Transmission Systems and Media, Digital Systems and Networks, Digital Sections and Digital Line System-Access Networks, Asymmetric Digital Subscriber Line Transceivers (ADSL) Transceivers," Jun. 1999, 256 pages.
International Telecommunication Union, "ITU-T G.992.3, Series G: Transmission Systems and Media, Digital Systems and Networks, Digital Sections and Digital Line System-Access Networks, Asymmetric Digital Subscriber Line Transceivers (ADSL2)," Apr. 2009, 404 pages.
International Telecommunication Union, "ITU-T G.992.5, Series G: Transmission Systems and Media, Digital Systems and Networks, Digital Sections and Digital Line System13 Access Networks, Asymmetric Digital Subscriber Line Transceivers (ADSL2), Extended Bandwidh (ADSL2plus)," Jan. 2009, 110 pages.
International Telecommunication Union, "ITU-T G.993.2, Amendment 5, Series G: Transmission Systems and Media, Digital Systems and Networks, Digital Sections and Digital Line System—Metallic Access Networks, Very High Speed Digital Subscriber Line Transceivers (VDSI2), Amendment 5: Short Reach VDSI2 with Reduced Power and Enhanced Data Rate," Jan. 2014, 10 pages.
International Telecommunication Union, "Telecommunication Standardization Sector of an ITU, Series G: Transmission Systems and Media, Digital Systems and Networks, Digital Sections and Digital Line System—Access networks, Physical Layer Management for Subscriber Line Transceivers, ITU-T G.997.1, Amendment 2," Apr. 2013, 10 pages.
International Telecommunication Union, "Telecommunication Standardization Sector of an ITU, Series G: Transmission Systems and Media, Digital Systems and Networks, Digital Sections and Digital Line System—Access networks, Very High Speed Digital Subscriber Line Transceivers 2 (VDSL2), Recommendation ITU-T G.993.2, Amendment 3," Apr. 2013, 24 pages.
ITU-T Telecommunication Standardization Sector ofiTU G.994.1 as extended by G.9701, Series G: Transmission Systems and Media, Digital Systems and Networks, Digital sections and digital line system—Metallic access Networks Handshake procedures for digital subscriber line transceivers, Apr. 2017, 910 pages.
ITU-T, "Fast Access to Subscriber Terminals (FAST)—Physical Layer Specification", G.9701—Dec. 2014, (Pre-publication version).
Karp, et al., "Zero-Forcing Frequency-Domain Equalization for Generalized DMT Transceivers with Insufficient Guard Interval," EURASIP Journal on Applied Signal Processing, 2004, vol. 10, pp. 1446-1459.
Maes, et al., "Maximizing digital subscriber line performance," Bell Labs Technical Journal, XP-002591690, 2008, vol. 13 (1), pp. 105-115.
Mujcic A., et al., "Influence of Data Frame Duration on Performance of BITCM System over HV Power Line," Joint IST Workshop on Mobile Future, SympoTIC '04, Oct. 24-26, 2004, pp. 150-153.
Result of Consultation mailed Mar. 22, 2011 for Application No. EP06794870.3, filed Oct. 23, 2006, 3 pages.
Search Report dated Oct. 26, 2018 for Chinese Application No. 201580028067.9, filed Apr. 30, 2015, 4 pages.
Search Report under Section 17(5) for Great Britain Application No. 1618870.8, dated Jul. 27, 2018, 3 pages.
Search Report under Section 17(5) for Great Britain Application No. 1618871.6, dated May 4, 2018, 3 pages.

(56) References Cited

OTHER PUBLICATIONS

Smee J E., "5G Design across Services" Qualcomm Technologies, Inc., Retrieved from https://johannesbergsummit.com/wp-content/uploads/sites/6/2014/11/Tuesday_3_John-Smee.pdf, May 2015, 23 pages.

Strobel, et al., "Coexistence of G.Fast and VDSL in FTTDP and FTTC Deployments," Rainer Strobel & Wolfgang Utschick, 23rd European Signal Processing Conference (EUSIPCO) Munchen, Germany, pp. 1103-1107.

Tang, et al., "Multiple Users Adaptive Modulation Schemes for MC-CDMA," Global Telecommunications Conference, 2004, Globecom '04, iEEE Dallas, TX, XP010758452, Nov. 29-Dec. 3, 2004, pp. 3823-3827.

Technical contribution HH-081, "VDSL2: Multi-Rate Impulse Protection," 2wire, ITU-T SG15/Q4 meeting, Hawaii, Jan. 17-21, 2005, 4 pages.

Technical contribution SI-045, "VDSL2: Proposal for Impulse Noise Mitigation Scheme for VDSL2," 2WIRE, The ITU-T SG15/Q4 meeting in Stresa, Italy, Oct. 2004, 2 pages.

Timmers M., et al., "G.fast: Evolving the Copper Access Network," Telecommunication Standards, IEEE Communications Magazine, Aug. 2013, pp. 74-79.

Written Opinion for Application No. PCT/GB/2006/003934, dated Jan. 9, 2007, 5 pages.

Written opinion of the International Preliminary Examining Authority for Application No. PCT/EP2015/068941, dated Aug. 31, 2016, 5 pages.

\* cited by examiner

Phone-Line to Power Circuit PLT Media Adaptor

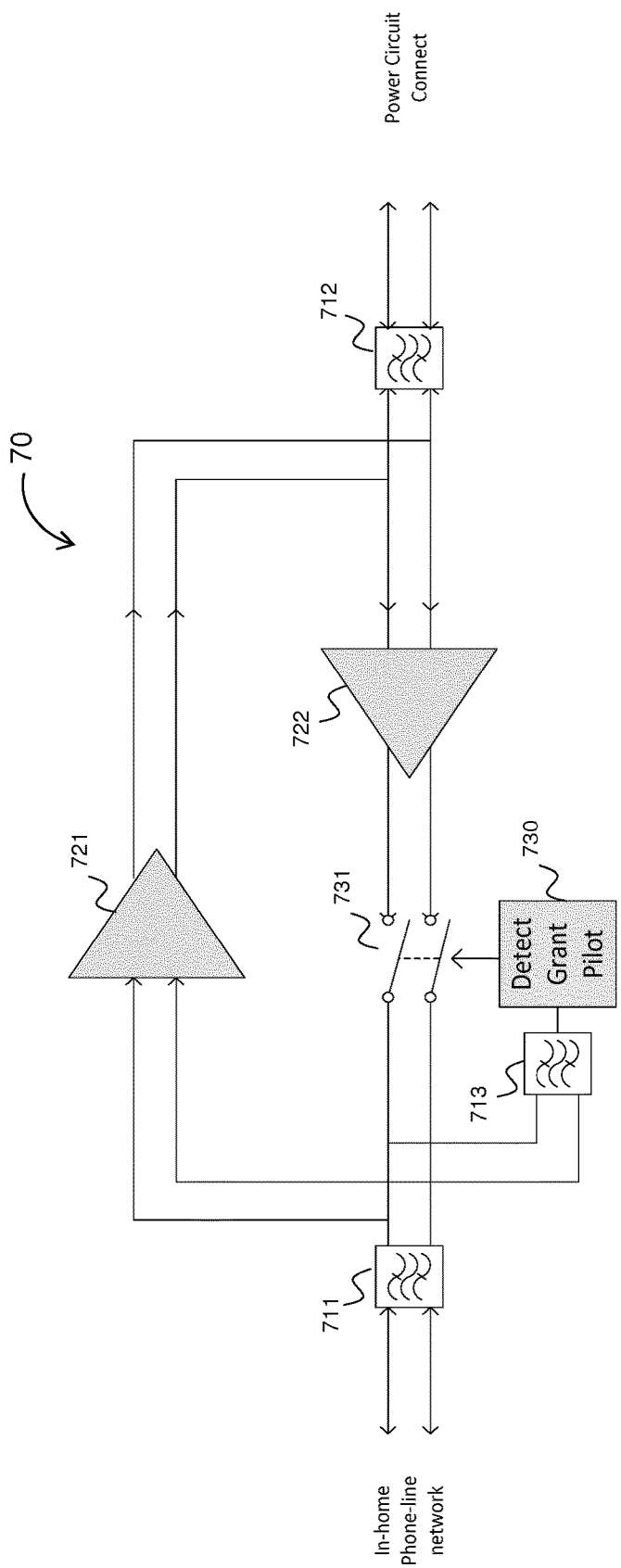

METHOD AND APPARATUS FOR OPERATING A DIGITAL SUBSCRIBER LINE ARRANGEMENT

CROSS-REFERENCE TO RELATED APPLICATION

The present application is a National Phase entry of PCT Application No. PCT/EP2017/078509, filed Nov. 7, 2017, which claims priority from GB Patent Application No. 1618870.8 filed Nov. 8, 2016, and EP Patent Application No. 16197854.9 filed Nov. 9, 2016, each of which are hereby fully incorporated herein by reference.

TECHNICAL FIELD

The present disclosure relates to a method and apparatus for operating a digital subscriber line operating in accordance with a protocol such as G.fast or VDSL2.

BACKGROUND

G.fast is a proposed protocol which is currently under development and is described (at least to some extent) in the ITU standards G.9700 and G.9701. For the purposes of the present application, the proposed G.fast protocol is considered to be a Digital Subscriber Line (DSL) technology and any modems operating in accordance with it are considered to be DSL modems.

Digital subscriber lines are lines (usually in the form of twisted copper pairs) with Digital Subscriber Line (DSL) modems operating at both ends (of the line). This permits data to be communicated over a line at much greater data rates than is achievable with old voice-band modems operating over the same line and is generally therefore referred to as "DSL broadband". The DSL modems may operate in accordance with any of various DSL standards agreed by the International Telecommunication Union (ITU). Over time newer DSL standards have been (and are still being) developed which permit ever greater data transmission rates to be achieved over digital subscriber lines. For example VDSL2 (as described in ITU standard G.993.2) is currently the highest capability DSL protocol for use with short lines (e.g. from a street cabinet to an end user's premises) which are already commercially in operation in the United Kingdom, whilst G.fast is still currently under development with commercially available G.fast compliant modems expected to be available commercially shortly.

A significant reason for the ability of protocols such as VDSL2 and G.fast to achieve much higher bandwidths than those possible with protocols adapted for use over much longer line lengths (e.g. ADSL2+), is their use of much greater frequency bandwidth ranges. For example, ADSL2+ operates in the frequency range from approximately 120 KHz to about 2.2 MHz whilst G.fast operates with frequencies up to 100 MHZ (and planned to go much higher in the future) and likely starts at a frequency of up to 30 MHz (to avoid damaging adjacent VDSL2+ lines—which operate with frequencies of up to 30 MHz).

At these frequencies, the signals can travel over (and transmit significant amounts of data over) a range of different media in addition to the usual twisted copper wire pairs. For example, as well as being able to be carried over normal, unshielded twisted copper pairs as typically found in Public Switched Telephone Network (PSTN) access networks, they can also travel over the power lines within users' premises, internal Ethernet cables (e.g. category 5 "Ethernet cables", etc.), television aerial co-axial cables, etc.

At present, broadband over DSL is supplied to a user premises using an approach/architecture in which a broadband connection is provided to and terminated at a single location (with a DSL modem located there) within a user's premises and then separate data connections are provided from that single location to other devices within the premises using any one or more different in house data distribution techniques such as Wi-Fi, wired Ethernet, powerline adapters, etc. A problem with this approach is that the different protocols used (e.g. G.fast to the DSL termination point, and an Ethernet over Powerline (e.g. as per the IEEE 1901 standard) from the DSL termination point to a user device located in another part of the premises) may cause interference to one another reducing the capabilities of both protocols and thus adversely affecting the quality (bandwidth, latency, jitter, stability/interruptions, etc.) of the data connection to the user device.

SUMMARY

According to a first aspect of the present disclosure, there is provided a system for transmitting data to a first and a second user device within a user's premises, the system comprising a distribution point having an aggregation device comprising a plurality of access network modems and having a plurality of lines connected thereto, a splitter device connected to the aggregation point (in particular to one of the access network modems therein) via one of the lines connected thereto and being located within the user's premises, a first connection between the splitter device and a first customer premises equipment modem, the first customer premises equipment modem being connected to the first user device, and a second connection between the splitter device and a second customer premises equipment modem, the second customer premises equipment modem being connected to the second user device, wherein the aggregation device is operable to transmit data for the first device via a first one of the plurality of modems in the aggregation device, the splitter device and the first customer premises equipment modem using a Digital Subscriber Line protocol and is operable to transmit data for the second device via the first one of the plurality of modems in the aggregation device, the splitter device and the second customer premises equipment modem using a Digital Subscriber Line protocol.

In some embodiments the Digital Subscriber Line protocol is a Time Division Duplex protocol such as, in one embodiment, G.fast. In such a case, the modems typically transmit frames of data in a back and forth manner; when operating in this manner, it is advantageous if the modem transmits a single frame for a single endpoint but with different complete frames being destined for different endpoints (e.g. odd numbered frames could be destined for the first user device and even numbered frames could be destined for the second user device, etc.).

The first and second connections between the splitter device and the first and second customer premises equipment modems can be formed at least partly from home wiring such as electrical power distribution cabling (i.e. the mains wiring within the user premises) telephone extension wiring or Ethernet cabling, etc.

In this way, use of a separate network to forward on data to different devices within a user's premises is avoided (or at least reduced) thus avoiding (or at least reducing) the problem of the different protocols interfering with each other. A home network (e.g. using WiFi) could still operate in parallel with embodiments of the present disclosure for transmitting data between devices operating in the home, however, in some embodiments, data between device could be transmitted via a server device located at the aggregation device or upstream of the aggregation device. This would probably be fractionally less efficient than using a home network and more susceptible to third party failures however in cases where the vast majority of data received by a user device comes from the Internet (e.g. from a content distributor) the improvements in the connections from the Internet greatly outweigh any deterioration in internal connections directly between devices within the home (e.g. between the first and second user device).

It will thus be apparent that the system according to the first aspect advantageously replaces the conventional single DSL termination location architecture/approach with a "Point-to-Multipoint" one in which there are multiple locations within a single user premises which can terminate the DSL connection using internal home wiring (e.g. telephone extension wiring or wiring used for providing internal Ethernet connections, or power distribution wiring).

According to a particular embodiment, within such a system, a modified vectoring scheme is used in order to minimize the data throughput in such a system. This embodiment therefore includes an aggregation device arranged to receive a plurality of lines each of which is connected to a user premises and wherein one of the user premises is a multi-terminating-point enabled premises and comprises a splitter device connected to the line (at an end remote from the end which the aggregation device is operable to receive) and at least two distinct terminating points each of which is connected to the splitter device via an in-premises connection and is operable to terminate a two part connection between the respective terminating point and the aggregation device via the splitter device, wherein the aggregation device comprises: a transmitter portion operable to transmit signals to a pre-coding unit (e.g. a vectoring unit) for precoding the signals (on a tone-by-tone basis) to be transmitted over the lines so as to minimize the interference from one signal to another by means of a pre-coding matrix; a memory storing a plurality of pre-coding matrices, or sets of components thereof, (on a tone-by-tone basis) each of which is adapted for use when transmitting signals to a respective terminating point within the (or each) multi-terminating-point enabled premises; a determination means for determining to which terminating point within the (or each) multi-terminating-point enabled premises a signal for transmission is destined; and a selection means for selecting a respective pre-coding matrix, or a set of components thereof, adapted for use when transmitting signals to the determined terminating point for use by the transmitter portion, whereby signals transmitted to a respective termination point are pre-coded using a pre-coding matrix which is adapted for use when transmitting signals to that termination point, and wherein the pre-coding matrices for use when transmitting signals to one termination point are different from the corresponding pre-coding matrices for use when transmitting signals to another termination point.

In some embodiments the first customer premises equipment modem is located in a different device to the second customer premises equipment modem. The first customer premises equipment modem may be located in the first user device. The second customer premises equipment modem may be located in the second user device.

Whether a completely new matrix is selected to completely replace the previous matrix for a new period of time (e.g. a transmission frame in G.fast), or whether just some components of the matrix are changed, is only a minor difference in implementation and the above second aspect is intended to cover both such possible implementation approaches. It should additionally be noted that respective matrices are preferably applied in respect of each different tone (i.e. on a tone-by-tone basis) and new matrices, or components thereof, can be modified from one frame to the next in respect of some tones but not others etc. thus achieving Frequency division Multiple Access (FDMA) as well as Time Division Multiple Access (TDMA) in order to share bandwidth between the first and second user devices.

Such vectoring in G.fast (whether applied to systems according to the first or second aspects or to systems including premises adopting the conventional single DSL termination location approach) may apply from a distribution point (e.g. in a telegraph pole or an underground distribution point connected between a street cabinet and a number of different user premises) containing a G.fast mini-DSLAM to a plurality of different user premises. In such a case, all of the lines connected to the G.fast mini-DSLAM could conveniently be formed into a vector group and vectoring coefficients for inclusion in a square vectoring matrix could be calculated and then applied for each line in that group. The resulting square matrix would have a size equal to the number of lines in the vector group (and therefore the number of lines connected to the mini-DSLAM).

It will be appreciated that in the system of the second aspect in which a "Point-to-Multipoint" approach/architecture is used, vectoring is modified when one or more lines in a vectored group are going to a Point-to-Multipoint arranged premises. In such a case, it can be advantageous if one adapts the vectoring coefficients which are used at any point in time to be appropriate for the particular endpoint within a user's premises to which the data is being transmitted (note that this seems to assume that at any point in time the DSLAM will be transmitting to only one of the possible multiple end points within each of the one or more Multipoint enabled premises—this is not a necessary assumption and embodiments which enable more than one end point to be transmitted to simultaneously are discussed below—in particular by using FDMA in addition to, or instead of TDMA). Thus the size of the square matrix would be the same but the coefficients associated with the line travelling to a Point-to-Multipoint" enabled premises would change based on which end point in a multipoint premises was "active" at any point in time. Thus the DSLAM would need to have many different matrices available and to select the appropriate one for any given possible combination of which end point was in use, or alternatively to have active coefficients within a matrix which vary depending upon which end point is active at a given point in time for a given tone.

The approach of having multiple termination points within a user's premises (i.e. having multipoint enabled premises) may be considered as being a type of convergence between the access network and the home network, because it can be viewed as extending the access network through a user's home to even closer to the user's end devices. For this reason the approach may also be referred to in the present document as a converged access/home network or something similar, etc.

In some embodiments, in addition to varying the pre-coding coefficients employed in the pre-coding matrices based on which end point(s) in the user's premises is (are) active for any particular tone and time slot combination, the aggregation device can be additionally operable to vary in a similar manner the post-coding vectoring matrix applied to decode incoming signals in order to account for which particular end points were actively transmitting back (upstream) to the aggregation device.

In some embodiments, determination of which coefficients to use for a particular tone, depending upon which end point in the user premises is active at that tone (at the relevant time), is performed by carrying out a largely conventional training procedure sequentially for each relevant different combination of possibly active end points.

In a simple case where, for example, there are only two lines connected to the aggregation device and only one of these is a multi termination point premises and where that premises only has two distinct termination points, then only two distinct training procedures will be required which will not be problematic. However, it will be apparent that the number of training procedures required can escalate quickly as the number of lines in the vectored groups increases and the number of distinct termination points within each multi termination point premises increases. For example for a six premises system where each premises has three distinct multi-termination points (e.g. one to a wifi router supporting multiple wifi enabled devices, one to a desktop PC and one to a TV set-top box device) then the number of required distinct training procedures would be 729. Al-though even this may be manageable (with each training procedure taking of the order of 2 minutes), 729 procedures could be completed in about one day which may just be acceptable in some cases.

However, in many cases this will not be practicable and an alternative approach may be necessary. As an example a training procedure could only be carried out when a particular combination is needed to be used for a first time. This would still cause a disruption to all users in the vector group for a 2 minute period or so however. An alternative approach might be to attempt to estimate crosstalk coefficients without carrying out a training procedure and instead using default coefficients (and assuming correspondingly poor channel conditions) when initially using a new combination and estimating from the detected signals and knowledge of what was intended to have been transmitted (after successfully decoding received transmissions from multiple devices at the DSLAM) what the coefficients actually are and updating the coefficients over time as more information is obtained (and preferably assuming initially at least that the downstream coefficients are approximately equal to the downstream coefficients in order to estimate suitable values for the pre-coding coefficients based on the estimated upstream coefficients). This should result in a slow improvement over time of the connections as increasingly better pre- and post-coding coefficients are estimated and used.

It also can be advantageous if the system is operable to automatically determine how to share the resources associated with the connection between multiple devices within a single premises (and further advantageously between multiple devices across a number of premises). Such resources, for example, may include tones (in order to implement FDMA) or time slots (in order to implement TDMA). In some embodiments, the determination takes into account the amount/rate of data required by each of the devices. In addition, the determination may further take into account any one or more of the additional factors: the acceptable bit error rate for the service required by the device, any other aspects of the service required by each device, the total amount of power which the transmitter is able to supply onto a particular line, the total amount of power In one embodiment, the system further comprises a media converter device which is operable to be connected between the splitter device and the first (or second) connection between the splitter device and the first (or second) customer premises equipment modem, the media converter comprising a band-pass filter for blocking (at least some) unwanted interference from the first (or second) connection from coupling into the splitter device, and an amplifier for amplifying signals prior to transmitting them onto the first (or second) connection, the amplifier being operable to amplify the signals to a value appropriate for the nature of the first (or second) connection.

In some embodiments, the media converter is a powerline media converter appropriate for conditioning signals so as to be able to be sent via internal, home premises, electrical power cabling. In such a case, the bandpass filter is adapted to remove 50 and 60 Hz signals (the frequencies commonly used for supplying electrical power in domestic premises) and the principal harmonics thereof. The media converter additionally includes an isolation transformer for protecting against DC power leakage from the mains power supply. In some embodiments, the band pass filter is operable to pass signals in at least one of the frequency ranges specified for G.fast operation in G.9700 and G.9701.

In some embodiments, the media converter includes a switch for completely disconnecting the circuitry upstream of the switch from the mains power supply. The media converter is then preferably arranged to close the switch (i.e. to allow signals to pass through the switch) only when the respective customer premises equipment modem connected via the media converter is actively transmitting or receiving data. As an alternative to such a switch, the media converter could instead provide an upstream amplifier in addition to the (downstream) amplifier for amplifying signals from the first (or second) connection towards its respective access network modem. By placing these amplifiers on different parallel paths, and by providing means for switching off the amplifiers completely when not in use, it is possible to achieve the desired switching functionality using only the amplifiers.

In one embodiment, the media converter may be formed as part of the splitter device. The splitter device may be an active or a passive splitter device. If active, it includes switching means to disconnect a connection (e.g. the first or second connection) when it is not being used whereas a passive splitter merely provides multiple connections and appropriate filtering needs to be used to ensure that unwanted signals don't propagate down unwanted paths and cause undesired interference issues.

In one embodiment, the media converter may provide a connection to a coaxial cable connected to a user premises television aerial, possibly on the roof of the user premises, and to permit transmission of the DSL signals over such television coaxial cable wiring within the user premises.

Further aspects of the disclosure include processor implementable instructions for causing a processor controlled device to carry out the method of the third or fourth aspects of the present disclosure and carrier means, such as tangible carrier means such as a magnetic or optical storage disc (e.g. a hard drive platter, or a CD or DVD) or a solid state storage device (e.g. a USB mini-drive, etc.), carrying such processor implementable instructions.

Generally, in access network terminology, there is considered to be a downstream and an upstream direction, with Customer Premises Equipment being at the most downstream point. DSL modems are sometimes therefore referred to as being either upstream or downstream modems where the downstream modem is the Customer premises side or CPE modem and the upstream modem is the network side or CO modem.

BRIEF DESCRIPTION OF THE DRAWINGS

In order that the present disclosure may be better understood, embodiments thereof will now be described, by way of example only, with reference to the accompanying drawings in which:

FIG. 6 is a schematic illustration of an alternative embodiment of the media converter of FIG. 5.

DETAILED DESCRIPTION

Figure 1:
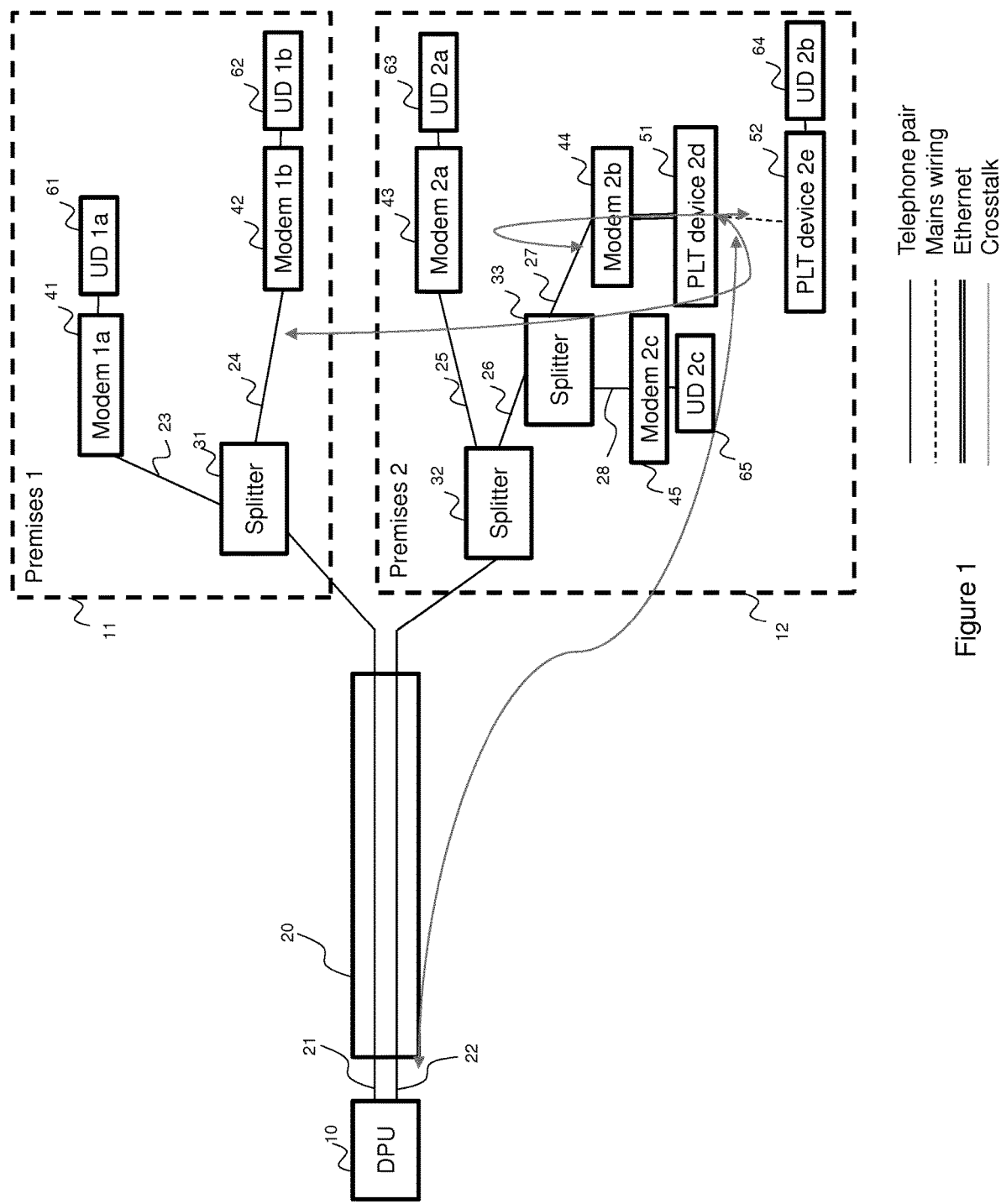
FIG. 1 is a schematic block diagram illustrating a Point to Multi-Point (P2MP) digital subscriber line arrangement comprising a Distribution Point Unit (DPU) containing at least two network side modems, a first and a second customer premises and two copper pair connections between the two customer premises which include multiple Customer Premises Equipment (CPE) modems each of which is connected to one of the two copper pair connections via a splitter device.

Referring to FIG. 1, a first embodiment of the present disclosure is illustrated in overview as comprising a Distribution Point Unit (10) which is connected via a first 21 and a second 22 twisted copper pair connection to a first customer premises 11 and a second customer premises 12 respectively. FIG. 1 illustrates how for a part of the path of the twisted copper pair connection 21, 22 they travel together in a common binder 20.

Within the first premises 11 there is a splitter device 31 to which is connected, via a first (first premises) connection 23, a first (first premises) CPE modem 41 (Modem 1*a*) and, via a second (first premises) connection 24, a second (first premises) CPE modem 42 (Modem 1*b*). Modem 1*a* is connected to a first (first premises) User Device 61 (UD1*a*) and Modem 1*b* is connected to a second (first premises) User Device 62 (UD 1*b*).

Within the second premises 12 there is a first splitter device 32 to which is connected, via a first (second premises) connection 25, a first (second premises) CPE modem 43 (Modem 2*a*) and, via a second (second premises) connection 26, a second Splitter device 33. The second Splitter 33 is connected, via a third (second premises) connection 27, to a second (second premises) CPE modem 44 (Modem 2*b*) and, via a fourth (second premises) connection 28 to a third (second premises) CPE modem 45 (Modem 2*c*). Modem 2*a* 43 is connected to a first (second premises) User Device 63 (UD 2*a*) and Modem 2*c* 45 is connected to a third (second premises) User Device 65 (UD 2*c*). The second CPE modem 44 (Modem 2*b*) in the second premises is connected to a second (second premises) user device UD 2*b* (reference numeral 64) via a pair of Power Line Telecommunication devices 51, 52 (PLT device 2*d*—reference numeral 51—and PLT device 2*e*—reference numeral 52).

FIG. 1 illustrates how there are various possibilities for cross talk to occur within this arrangement by means of the double-headed arrows. These show that cross-talk may occur between the PLT connection and the twisted copper pair connections 21, 22; it may also occur between the PLT connection and the in premises connections 25, 26, 27, 28 within the second premises 12. Finally it may also occur between the PLT connection and the in-premises connections 23, 24 of the first premises 11. It should also be noted that there may be cross talk between the first and second twisted pair connections 21 and 22 and between any of the in premises connections 25, 26, 27, 28 of the second premises and either of the in premises connections 23, 24 of the first premises 11. Note though that in general only a single in-premises connection 25, 26/27, 26/28 of the second premises will be active at a given tone at any given point in time and similarly only a single one of the in premises connections 23, 24 of the first premises will be active at any given tone at any given point of time. Thus there should not be significant cross talk between the in premises connections within a single premises.

Thus this arrangement avoids the need for a separate in-premises network which would operate simultaneously with the DSL connection thus avoiding the need to terminate one connection and re-establish another connection as well as reducing the possibility of interference from the two competing protocols interfering with one another (except for the PLT connection which can still produce interference to the DSL connections).

Figure 2:
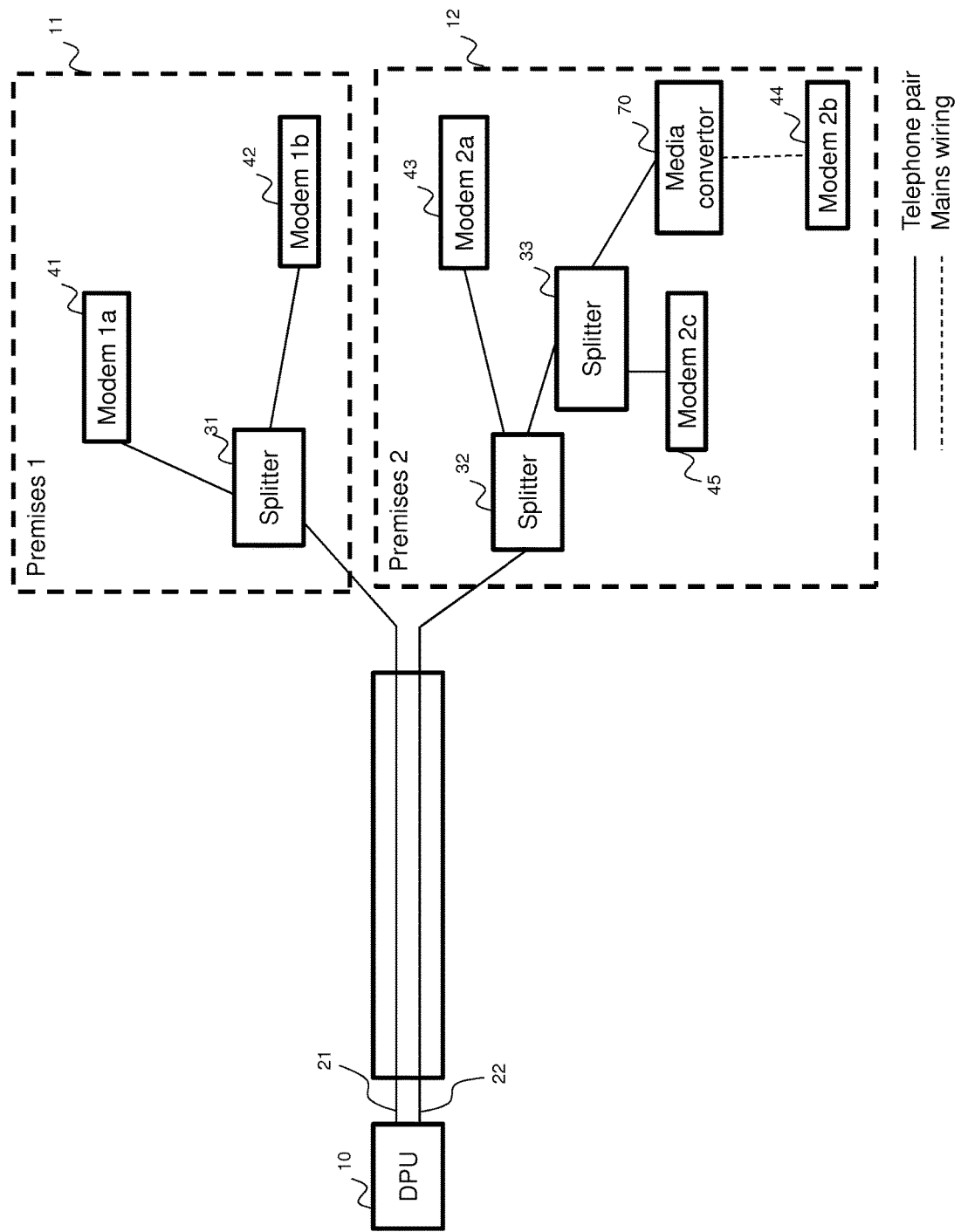
FIG. 2 is a schematic block diagram illustrating a P2MP arrangement similar to that of FIG. 1 but with a media converter being used in place of a pair of Power Line Telecommunications (PLT) devices.

FIG. 2 shows an advantageous embodiment compared to that of FIG. 1. In this embodiment (in which like numerals represent like components), the PLT devices 51 and 52 have been replaced with a media converter 70 which performs some simple analog processing of the DSL signal in order to transition between the in-premises connection 26/27 (which may, for example, be simple Ethernet cables) and the mains power lines in the premises (thus the media converter 70 is conveniently designed as a single integral device which plugs into a power socket within the premises as PLT devices do, with an Ethernet port (i.e. a 6p6c jack) for receiving an Ethernet cable (e.g. a cat 5 cable) which is connected to the splitter device 33). The media converter includes a pass-band filter for permitting DSL signals to pass but blocking undesired signals (e.g. it may be configurable between a low pass limit of about 2 MHz to block low frequency signals generated by the mains current and largely irrelevant to G.fast or other short range DSL-like protocols and an upper pass limit configurable between about 100 MHz and 300 MHz-300 MHz is the upper limit usable by G.fast currently whilst it may be beneficial to reduce the upper limit to less than the system limit in order to reduce the amount of noise at these frequencies produced by the signal travelling over the mains wires—the spectrum between the upper limit (e.g. 100 MHz and the system limit (if any) can be used advantageously exclusively for any other devices connected (via the splitter device) not via the media converter. The media converter 70 additionally includes analogue amplification means for increasing the power of the signal before safely coupling the signal onto the mains wiring using conventional techniques known in the Power Line Telecommunications (PLT) art. Similarly, the upstream signal may be amplified (or attenuated) prior to leaving the media converter in order to travel (via the splitter) towards the DPU.

This arrangement is an improvement over that of FIG. 1 because it removes the PLT connection which operates simultaneously with the DSL connection in the arrangement in FIG. 1 causing cross-talk interference between the connections and thus reducing the effectiveness of both of those connections.

Figure 3:
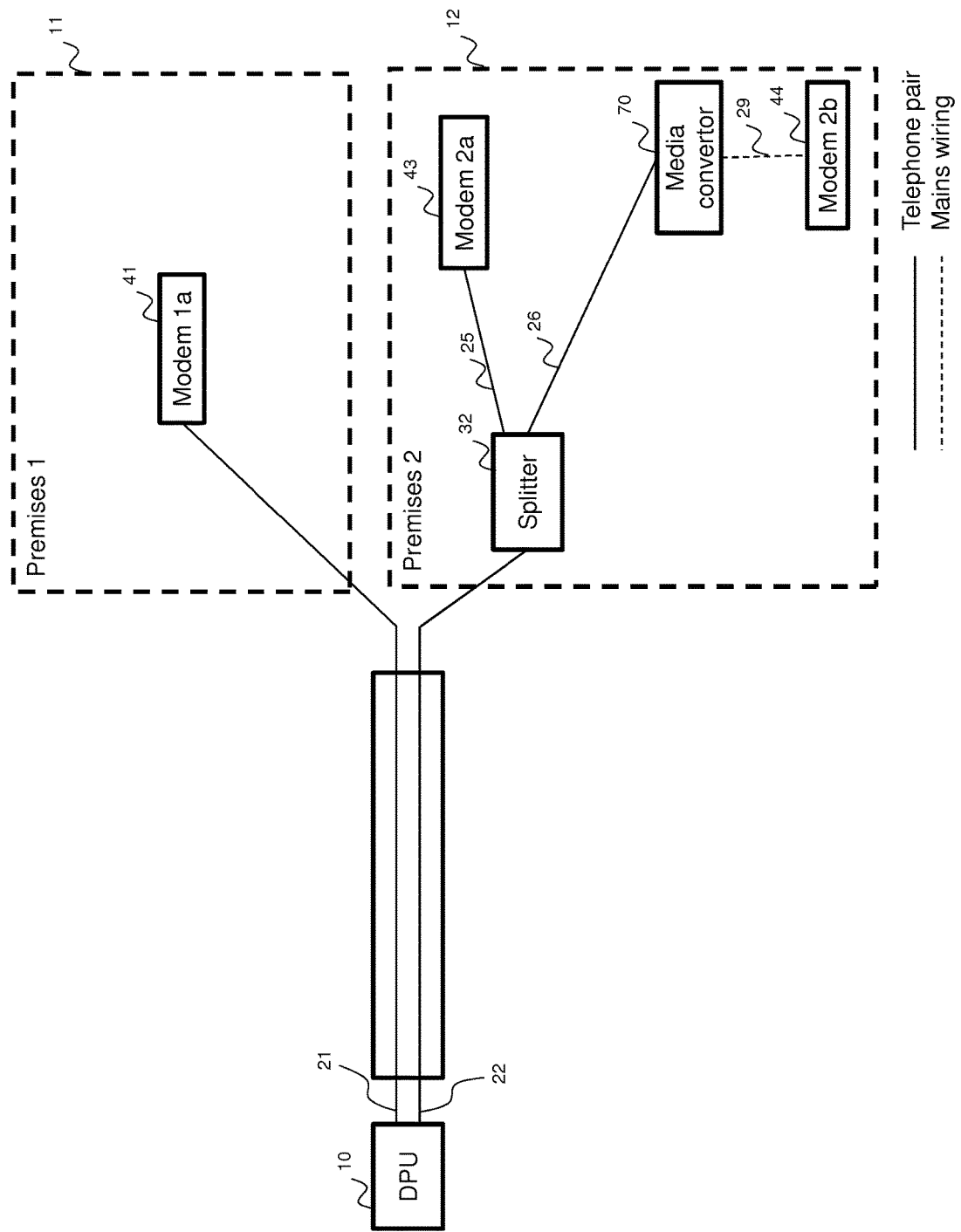
FIG. 3 is a schematic block diagram similar to FIG. 2 but illustrating a simpler arrangement in which the first user premises has only one CPE modem (and consequently no splitter device) and the second user premises has only two CPE modems a first of which is connected directly to the splitter device and the second of which is connected to the splitter device via the media converter.

FIG. 3 illustrates a simplified arrangement in which the first premises now has only a single modem 41 and hence no need for a splitter and the second premises has a single splitter with just 2 modems 43, 44, the second of which (modem 2b reference 44) is connected to the splitter 32 over the mains wiring via a media converter device 70 as before.

Figure 4:
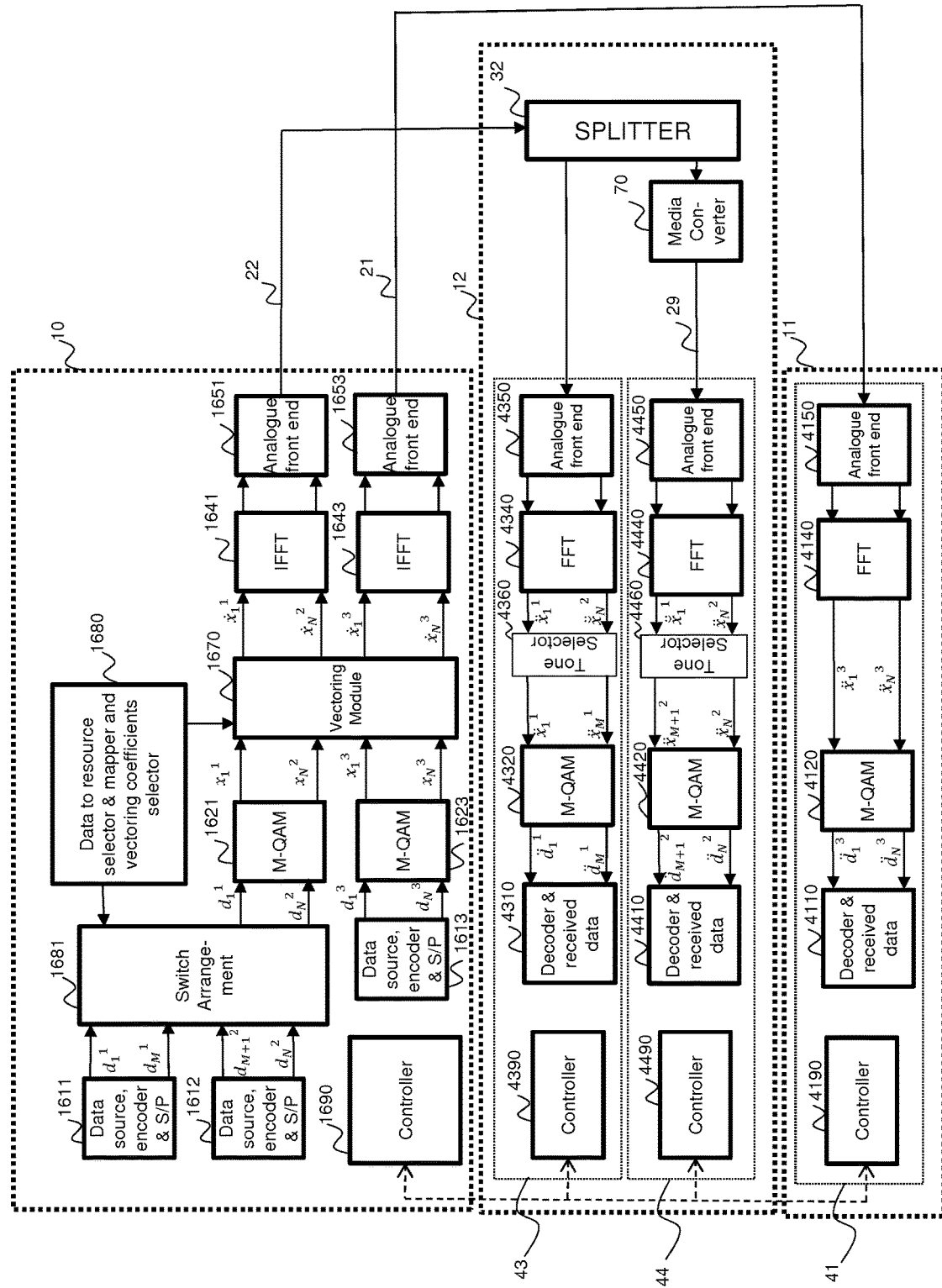
FIG. 4 is a schematic block diagram illustrating the DPU and the CPE modems of FIG. 3 in greater detail.

FIG. 4 illustrates the DPU 10, first premises 11 (containing modem 41) and second premises 12 (containing modems 43 and 44) of FIG. 3 showing the transceiver components in more detail. In particular, FIG. 4 illustrates how a modified form of vectoring is used in order to optimally mitigate the cross talk that can arise between the neighboring premises 11 and 12. The figure only illustrates components relevant to downstream transmission however it will be apparent to the reader how corresponding upstream transmissions will function (and a brief comment on the upstream case is mentioned at the end of the present description of the downstream process).

As shown, the DPU 10 comprises three data source, encoder and serial to parallel converter modules 1611, 1612 and 1613, each of which provides an appropriate rate of data for transmission to a respective downstream modems 43, 44 and 41 respectively. This is controlled by the Controller 1690 and the Data to Resource selector & Mapper and Vectoring Coefficients selector (DRMVC) module 1680 as explained in greater detail below. In particular, the DRMVC module 1680 runs an optimization model as set out in greater detail below in the attached appendix in order to allocate tones to modems 43 and 44 on a per time slot (e.g. per frame) basis in order to optimally supply bandwidth to the modems according to their demands in a manner which optimizes the total bandwidth across all devices taking into account the effects of crosstalking interference (and other interference). The DRMVC module 1680 also controls the switch arrangement 1681 such as to cause the switch arrangement to take the data items $d_1^1$ to $d_M^1$ coming from Data Source 1611 (and destined for modem 43) and data items $d_{M+1}^2$ to $d_N^2$ coming from Data Source 1612 (and destined for modem 44) and map them to selected tones $n_1$ to $n_N$ for supplying to the M-QAM module 1621. In the present example, the switch arrangement is illustrated for simplicity as mapping the $d_1^1$ to $d_M^1$ items to the first M tones and the $d_{M+1}^2$ to $d_N^2$ to the remaining (N-M) tones however it will be appreciated that this need not be the case and the switch arrangement is capable of assigning any data items to any tones.

As explained above the output from the switching arrangement 1681 is a set of N data items (being a mix of data items destined for modem 43 and data items destined for modem 44) for encoding using an M_QAM quadrature amplitude modulator. The constellation size for each tone can be variable and depends upon the modem to which the data is destined for reasons which will be (or become) apparent. The particular size is chosen (by the DRMVC 1680) to correspond to the size of the incoming data unit and is chosen to satisfy the channel requirements of the channel over which it will be passing in particular the achievable bit loading associated with the corresponding bin as will be appreciated by readers skilled in the art of DSL transmission techniques. A similar set of data items $d_1^3$ to $d_N^3$ is output from the Data source module 1613 for transmission to the modem 41. These are input to a corresponding QAM module 1623.

As is conventional, the outputs form the QAM modules are corresponding complex numbers, x, corresponding to the respective input data items, d. These are input to a Vectoring module 1670 which pre-codes the complex numbers based on precoding coefficients selected by the DRMVC module 1680. The particular coefficients chosen depend upon the actual channels over which the data is travelling (and thus on to which modem the data is destined to be transmitted). These coefficients having been predetermined by performing a training procedure involving selectively transmitting over the different channels in order to determine the different channel characteristics. The mathematical procedures will be apparent to persons skilled in the art especially in view of the attached Appendix.

The pre-coded complex numbers are then passed in the usual manner from the vectoring module 1670 to respective Inverse Fast Fourier Transform (IFFT) modules which convert the complex number from the frequency domain to the time domain so that they are combined into a signal time domain signal which can be transmitted over the twisted copper pairs (via the respective analogue front end modules 1651 and 1652 which operate in an entirely standard manner).

When the signal is received at the first premises, via the first twisted copper pair 21, it is processed in an entirely conventional manner using the conventional receiver modules of the AFE module 4150, Fast Fourier Transform (FFT) module 4140 and M-QAM demodulator module 4120 in order to obtain the transmitted data $d_1^3$ to $d_N^3$ at a decoder module 4110.

When the signal destined for modems 43 and 44 is received at the second premises 12 however it passes into splitter 32. This could be an active splitter which switches off one of the paths downstream of it when it is not being used or could be a passive splitter which always leaves both paths open downstream of it. In the present embodiment the splitter is considered to be a passive splitter. In any event, where the system is operating in an FDMA mode in which some tones are allocated to one modem and some to the other as in the present example, the splitter would have to keep both paths open in any event since the signal is still in the time domain and cannot therefore be easily switched off (over all frequencies—in some embodiments it could employ variable band pass filters in order to effectively switch off the path for certain frequencies which are not being used by the respective downstream modem—such a technique is unlikely to be able to perform more than crude separations in frequency between the different paths though so it would be necessary to clump tones for a respective modem together rather than more liberally interspersing the tones throughout the total usable frequency range as can advantageously be performed when using a passive splitter or when leaving both paths with an active splitter device).

One downstream path from the splitter 32 passes (via in premises connection 25—e.g. an Ethernet cable from the splitter 32 to the modem 43) directly to an AFE module 4350 of the modem 43. The other passes via the media converter 70 and the mains wiring 29 to an AFE module 4450 (this is adapted according to conventional techniques to be able to safely extract the differential signal from the mains wiring using conventional PLT techniques) of the modem 44. The AFE modules 4350 and 4450 of the respective modems 43 and 44 extract the transmitted signals and forward them to FFT modules 4340 and 4440 respectively which convert the time domain signal into a series of complex numbers corresponding to the time domain version of the signal in known manner.

At this point, it is important to note that the outputs of the FFT's will be different in the different modems because the signals have passed through different channels in order to get to the modems. Nonetheless, it will be appreciated that the tones destined for the modem 43 have been pre-coded and modulated in such a way as to be suitable, after processing by the FFT 4340, for detection using the M-QAM demodulator 4310 and similarly, the tones destined for modem 44 have likewise been pre-coded and modulated in such a way as to be suitable, after processing by the FFT 4440, for detection using the M-QAM demodulator 4310. Thus the outputs from the FFT modules 4340 and 4440 are passed to respective tone selector devices 4360 and 4460 which simply discard the tones not destined for the respective modem. The remaining tones (i.e. complex numbers z corresponding to the tones) are then demodulated by the respective demodulators 4320 and 4420 to recover the data items originally issued from the data source modules 1611, 1612 for decoding and parallel to serial conversion, etc., by the decoder modules 4310 and 4410 in the conventional manner. The various controllers 1690, 4390, 4490 and 4190 together with the DRMVC module all interact to ensure that the operation is well cooperated.

When operating in the upstream direction, he downstream modems 41, 43, 44 operate largely conventionally except that the modems 43, 44 only use tones as specified by the DPU such that they do not transmit using the same tones as each other (e.g. modem 43 uses the first M tones while modem 44 uses the remaining M-N tones). A post-coding vectoring module at the DPU then postcodes the received tones in accordance with the channels from which the signals have arrived and knows which tones are allocated to which modems and sorts them via a tone selector module after demodulation in order to allocate the received data to the appropriate onward component.

Figure 5:
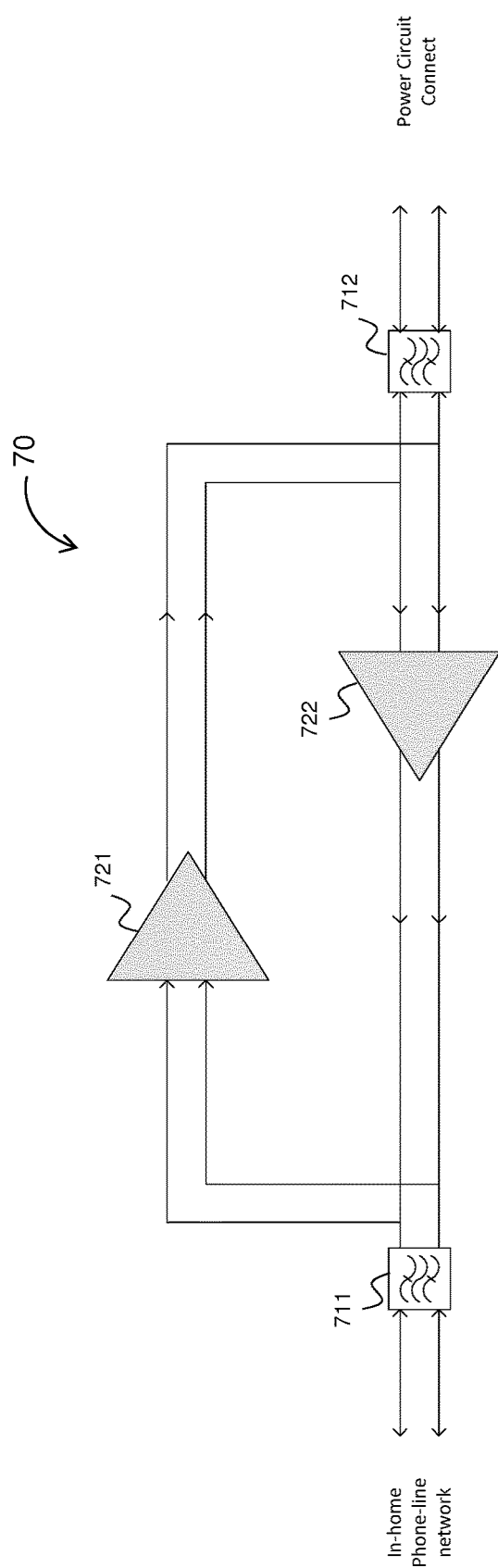
FIG. 5 is a schematic illustration in greater detail of the media converter device of any of FIGS. 2 to 4.

FIG. 5 illustrates the primary components of the media converter 70. As shown, the media converter includes a first 711 and second 712 band pass filter and first 721 and second 722 amplifiers. As mentioned above, these control the signals flowing onto and off the mains wiring to limit noise whilst maximizing the SNR of signals as they pass over the mains wiring connection.

FIG. 6 illustrates an alternative embodiment of the media converter 70 in which a detect grant pilot module 730 is additionally employed (together with an optional band pass filter which only passes the pilot tones) and this is used to enable the DPU to control when the switch 731 is enabled or not. The grant pilot signal may be one dedicated (ideally low frequency) tone set for DMT modulation so it would naturally be aligned to the TDD framing (of G.fast) based on DMT symbol time. Alternatively, a bank of low frequency tones could be left blank so the marker signal can be extracted by a simple low pass filter (probably analogue) which would keep the DMT tone burst proper—starting at a frequency well above the control tone—out of the control receiver. The tone could use simple on-off signaling to switch one media converter on and off. Another approach which is more robust against interference is to use a DTMF like coding which could have a set of say 5 tones for up to 5 converters—a single tone for each. If each tone is bound to a particular converter, then more than one can be turned on at the same time, enabling some frequencies to be used on one converter and other frequencies on another. This provides for hybrid TDMA and FDMA. An even more complex approach using 2 out five coding could address 10.

Note that the frame structure will have dedicated capacity e.g. in the form of a robustly coded control symbol, and response opportunities where by the remote end can indicate waiting traffic which then leads to the remote end being given opportunities to talk. The downstream time/frequency allocation (and media converter switching) is driven by DS traffic demand encountered at the DPU. So the DPU controls every transmit opportunity and grants access according to the traffic arriving at the inlets at the DPU and all the registered outstation. This is fairly conventional behavior for cable systems except in using hybrid time and frequency division multiple access.

The invention claimed is:

1. A system for transmitting data to a first user device and a second user device within a user premises, the system comprising:
   a distribution point having an aggregation device comprising a plurality of access network modems and having a plurality of lines connected thereto;
   a splitter device connected to the aggregation device via one of the lines connected thereto and being located within the user premises, a first connection between the splitter device and a first customer premises equipment modem, the first customer premises equipment modem being connected to the first user device, and a second connection between the splitter device and a second customer premises equipment modem, the second customer premises equipment modem being connected to the second user device,
   wherein the aggregation device is operable to transmit data for the first user device via a first one of the plurality of network modems in the aggregation device, the splitter device and the first customer premises equipment modem using a Digital Subscriber Line protocol and operable to transmit data for the second user device via the first one of the plurality of modems in the aggregation device, the splitter device and the second customer premises equipment modem using a Digital Subscriber Line protocol.

2. A system according to claim 1, wherein the aggregation device is arranged to receive a plurality of lines, each of the plurality of lines connected to a user premises and wherein one of the user premises is a multi-terminating-point enabled premises and comprises a splitter device connected to the line and at least two distinct terminating points each of which is connected to the splitter device via an in-premises connection and is operable to terminate a two part connection between the respective terminating point and the aggregation device via the splitter device, and wherein the aggregation device comprises:
   a transmitter portion operable to transmit signals to a pre-coding unit for precoding the signals on a tone-by-tone basis to be transmitted over the lines so as to minimize the interference from one signal to another by a pre-coding matrix;
   a memory storing a plurality of pre-coding matrices, or sets of components thereof, on a tone-by-tone basis each of which is adapted for use when transmitting signals to a respective terminating point within the or each multi-terminating-point enabled premises;
   a determination means for determining to which terminating point within the or each multi-terminating-point enabled premises a signal for transmission is destined; and a selection means for selecting a respective pre-coding matrix, or a set of components thereof, adapted for use when transmitting signals to the determined terminating point for use by the transmitter portion, whereby signals transmitted to a respective termination point are pre-coded using a pre-coding matrix adapted for use when transmitting signals to that termination point, and wherein the pre-coding matrices for use when transmitting signals to one termination point are different from the corresponding pre-coding matrices for use when transmitting signals to another termination point.

3. A system according to claim 2, wherein the system is operable to automatically determine how to share resources associated with the connection between multiple devices within a single premises.

4. A system according to claim 3, wherein the determination takes into account the amount or rate of data required by each of the devices.

5. A system according to claim 4, wherein the determination further takes into account any one or more of the following additional factors: the acceptable bit error rate for the service required by the device, another aspect of the service required by each device, a total amount of power which the transmitter portion is able to supply onto a particular line, and a total amount of power.

6. A system according to claim 1, wherein the first customer premises equipment modem is located in a different device than the second customer premises equipment modem.

7. A system according to claim 1, wherein the first customer premises equipment modem is located in the first user device.

8. A system according to claim 1, wherein the second customer premises equipment modem is located in the second user device.

9. A system according to claim 1, wherein the Digital Subscriber Line protocol is a Time Division Duplex protocol.

10. A system according to claim 1, wherein the first and second connections between the splitter device and the first and second customer premises equipment modems are formed at least partly from home wiring.

11. A system according to claim 1, wherein the system further comprises a media converter device operable to be connected between the splitter device and the first connection between the splitter device and the first customer premises equipment modem, the media converter device comprising a band-pass filter for blocking unwanted interference from the first connection from coupling into the splitter device, and an amplifier for amplifying signals prior to transmitting them onto the first connection, the amplifier being operable to amplify the signals to a value appropriate for a nature of the first connection.

12. A system according to claim 11, wherein the system further comprises a media converter device operable to be connected between the splitter device and the second connection between the splitter device and the second customer premises equipment modem, the media converter device comprising a band-pass filter for blocking unwanted interference from the second connection from coupling into the splitter device, and an amplifier for amplifying signals prior to transmitting them onto the second connection, the amplifier being operable to amplify the signals to a value appropriate for a nature of the second connection.

13. A system according to claim 11, wherein the media converter device is a powerline media converter for conditioning signals so as to be able to be sent via internal home premises electrical power cabling.

14. A system according to claim 13, wherein the band-pass filter is adapted to remove 50 Hz and 60 Hz signals.

15. A system according to claim 11, wherein the media converter device additionally includes an isolation transformer for protecting against DC power leakage from a mains power supply.

\* \* \* \* \*